F. PRICE.
CHASING LATHE.
APPLICATION FILED OCT. 10, 1917.

1,282,461. Patented Oct. 22, 1918.
4 SHEETS—SHEET 1.

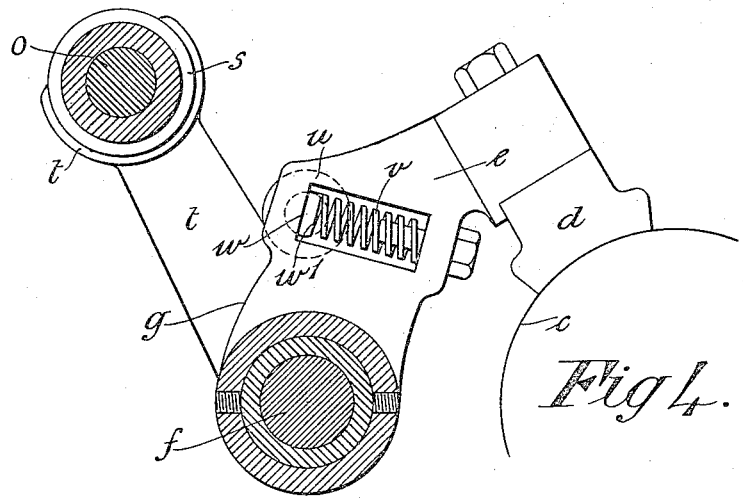
Fig 4.
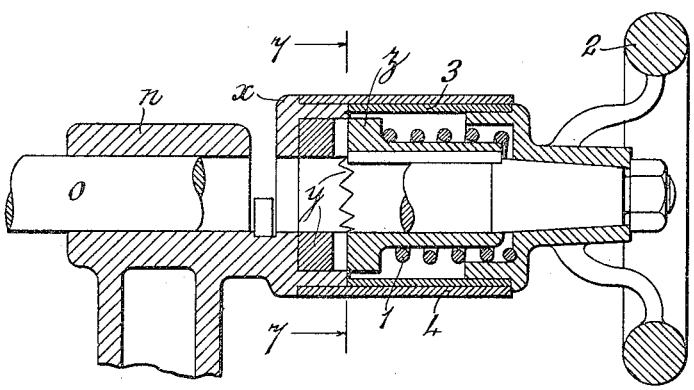
Fig 6.
Fig 8.

UNITED STATES PATENT OFFICE.

FREDERICK PRICE, OF STECHFORD, BIRMINGHAM, ENGLAND, ASSIGNOR OF ONE-HALF TO CHARLES BIRCH, OF WALSALL, ENGLAND.

CHASING-LATHE.

1,282,461.  Specification of Letters Patent.  Patented Oct. 22, 1918.

Application filed October 10, 1917. Serial No. 195,783.

*To all whom it may concern:*

Be it known that I, FREDERICK PRICE, subject of the King of Great Britain, residing at Stechford, Birmingham, in the county of Warwick, England, have invented new and useful Improvements in and Relating to Chasing-Lathes, of which the following is a specification.

This invention comprises improvements in and relating to chasing lathes and has for its object to provide means whereby the depth of cut taken by the tool when operating on a piece of work can be more readily and accurately controlled by the operator. The invention is particularly applicable to the known type of chasing lathe in which the motion of the tool when in operation is obtained by means of a revolving screwed member (the copy or hob) driven by the lathe spindle either direct or through gearing, the tool being advanced to or removed from the work, which is rotating, by means of a hinged arm, which may be pressed more or less toward the work by the operator, the movement of the arm and consequently the depth of cut being controlled by a cam with which a stop on the arm engages.

According to this invention, in a lathe of the type above described, there is provided a control device, such as a ratchet, for regulating the angular position of the cam which controls the depth of the cut. Preferably an indicator device is combined with the control means of the cam whereby the correct adjustment of the latter is facilitated as hereinafter described.

To enable the invention to be clearly and readily understood reference will be made in describing same, to the accompanying drawings, wherein is shown an example of the invention.

In the drawings referred to:—

Fig. 4 is a cross sectional view on line 4—4 of Fig. 1 looking toward the left.

Fig. 5 is a front view of the indicator device on the cam shaft.

Fig. 6 is a longitudinal section of the means for adjusting the control cam and indicating its angular position.

Fig. 7 is a cross section on line 7—7 of Fig. 6 looking toward the right.

Fig. 8 represents in a plane the markings on the cylindrical surface of the indicating drum.

Fig. 1 is drawn to a smaller scale than the remaining figures, and throughout the drawings like parts are designated by the same reference characters.

Figure 1:
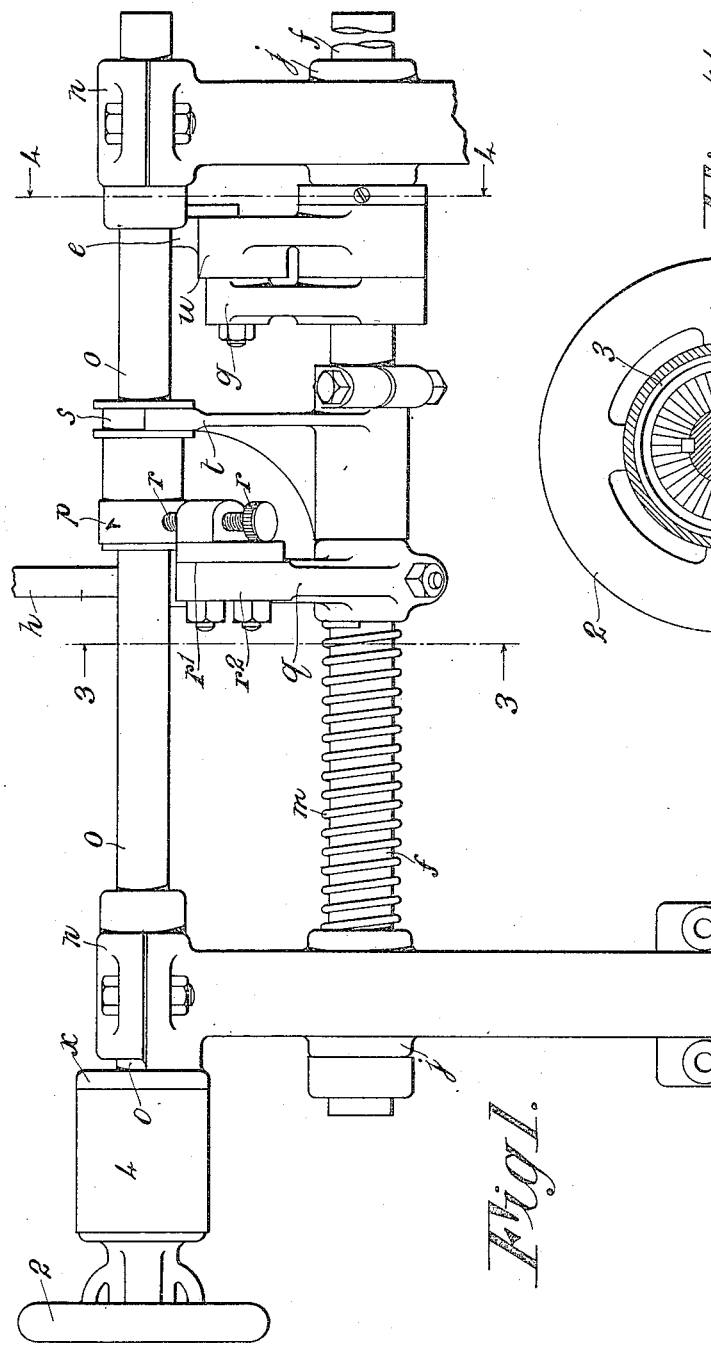
Figure 1 is a rear elevation of the improved chasing or screw cutting mechanism of a lathe.
Figure 2:
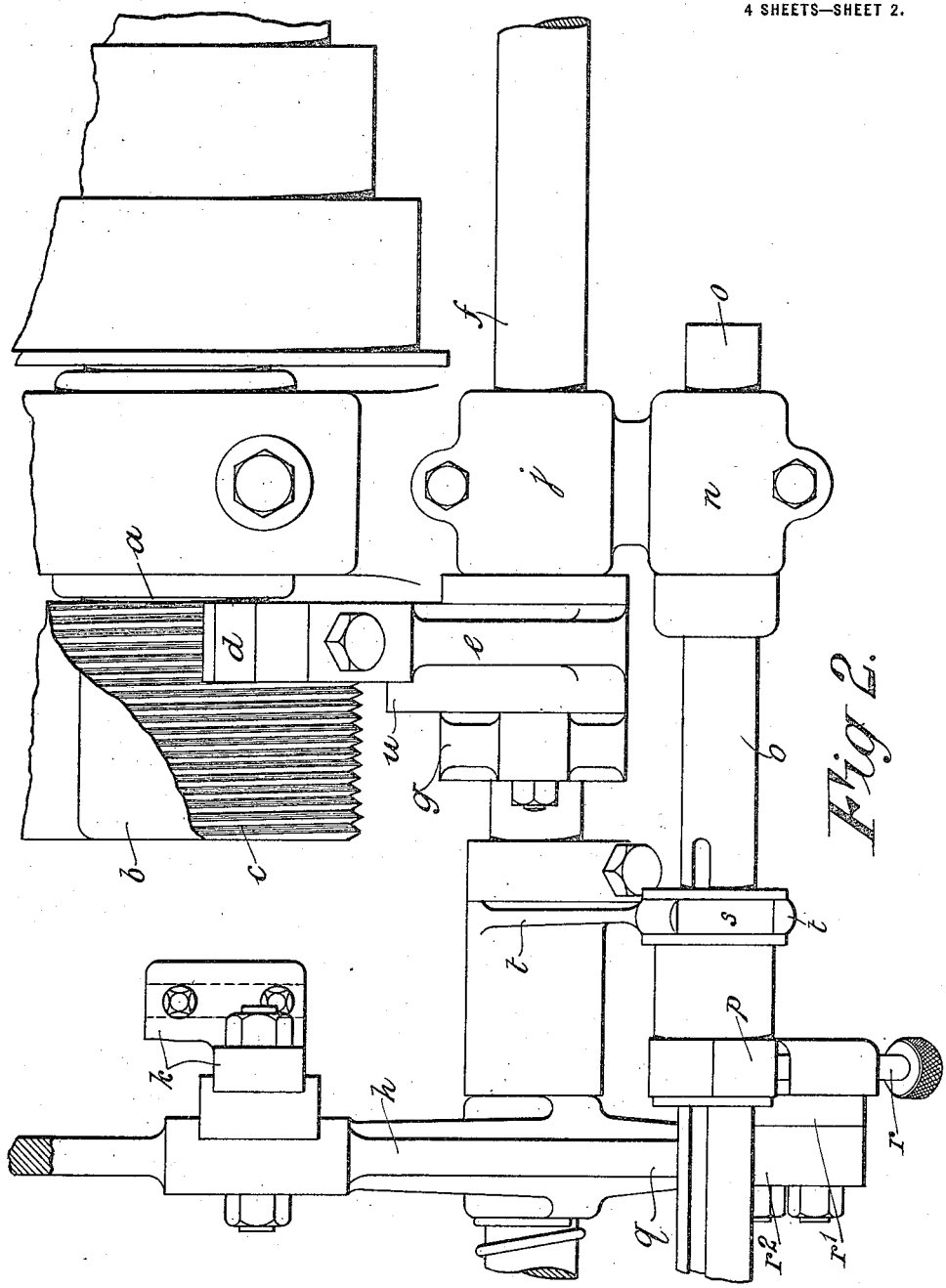
Fig. 2 is a partial plan thereof.
Figure 3:
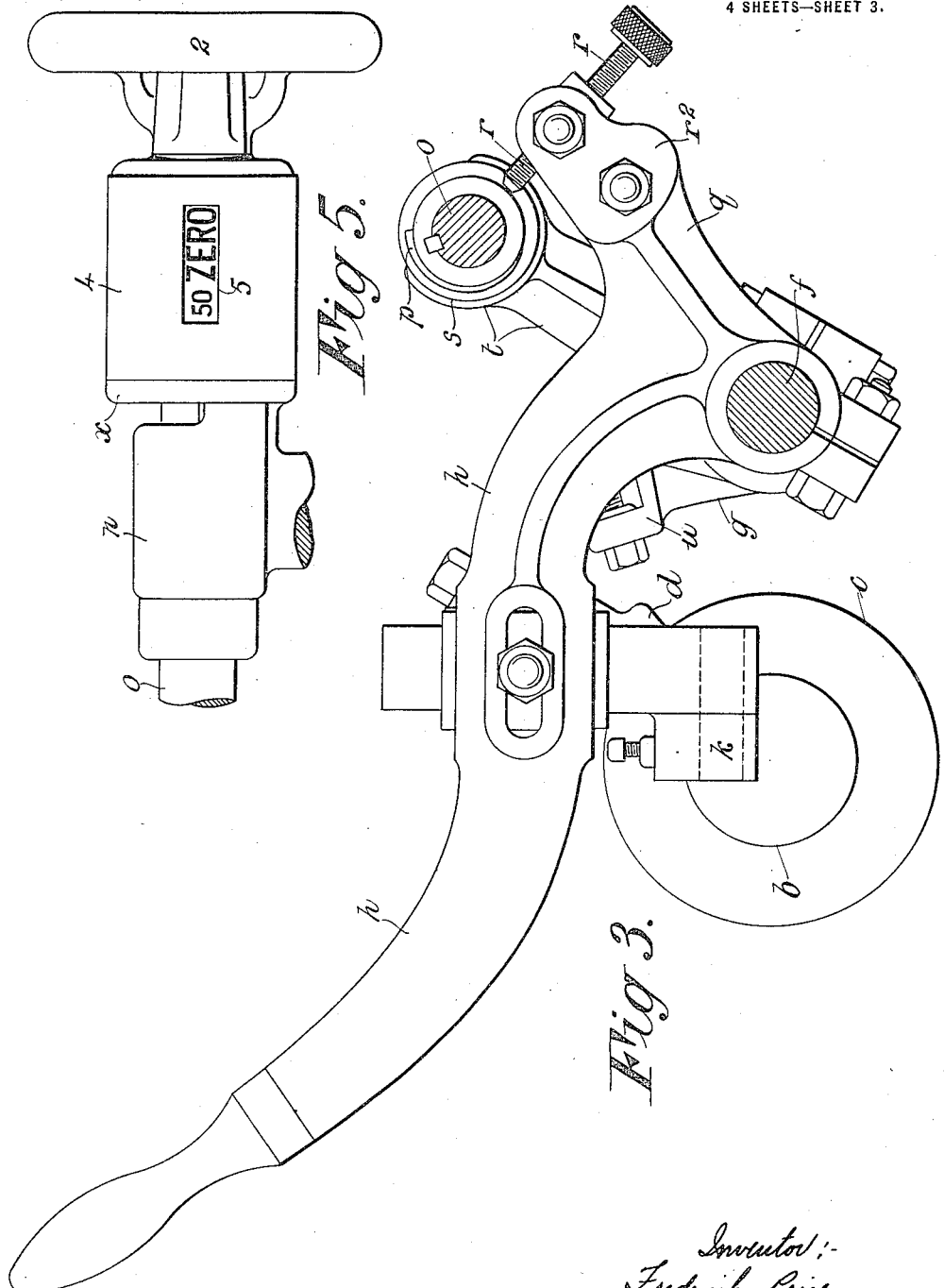
Fig. 3 is a cross sectional view on line 3—3 of Fig. 1 showing the chaser arm and the cam controlling the depth of cut.

On the drawings $a$ is the work spindle, $b$ the end of same which receives the chuck which may follow on any approved lines, $c$ is the copy or hob, $d$ the follower working on the copy or hob, $e$ the follower arm loosely mounted on the sliding shaft $f$ and adapted to be actuated by means of a second arm $g$ (keyed on the shaft) when the shaft is rocked by the lever or chasing arm $h$ which is fast on the shaft and rocks the latter in its bearings $j$. As the chasing arm $h$ is rocked and pressed toward the work to bring the tool carried in the holder $k$ (Figs. 2 and 3) on the arm, into engagement with the work, the shaft $f$ is rocked and the arm $g$ presses the follower arm $e$ and the follower $d$ on to the copy or hob $c$. As the follower $d$ advances on the thread of the hob $c$, the shaft $f$ slides in its bearings against the action of a spring $m$ (Fig. 1) which returns the shaft and the arms mounted on it when the chasing arm is rocked clear of the work and the follower is rocked away from the hob $c$.

The brackets for the sliding rockshaft $f$ on which the chasing arm $h$ is mounted are provided with additional bearings as at $n$ for a shaft $o$ on which a cam $p$ is feather keyed. The cam $p$ may be eccentric with a sharp drop from the highest position farthest from the axis to the lowest position nearest to the axis. The chasing arm $h$ or the shaft $f$ carrying it is provided with an extension $q$ (Figs. 1, 2 and 3) say oppositely directed with respect to the said arm, and a stop $r$ is secured in an adjustable sleeve $r'$ carried by the slotted part $r^2$ of this extension $q$. The stop may if desired have a roller for bearing on the cam $p$. When the cam $p$ is in such an angular position that the stop rests on the "highest" part of the cam i. e. the initial position, the chaser arm $h$ is permitted by the stop to be rocked until the tool is just on or just clear of the surface of the work; and from that the cam becomes less steep until the lowest part is reached corresponding to the deepest cut permitted to the tool by the particular cam.

In the appended claims the chasing arm $h$, extension $q$ and tool holder $k$ are, for the sake of brevity, referred to collectively as the chasing member.

To insure the cam, which may then be short in an axial direction, sliding on the cam shaft $o$, to which it is feather keyed, so as to follow the advance of the chaser arm $h$ as the tool advances on the work, it is provided with a grooved collar or spool $s$ engaged by a fork $t$ loosely mounted on the sliding rock shaft $f$ but sliding with same.

The follower arm $e$ has a slot or box portion $u$ in which a spring $v$ (Fig. 4) is housed and the second arm $g$ keyed on the rockshaft which actuates the loose follower arm is provided with a stud or pin $w$ having a flattened portion $w'$ which engages one end of the spring $v$ and yieldingly presses the follower arm $e$ toward the hob or copy $c$ as the chaser arm $h$ is rocked toward the work. The pin $w$ and slot $u$ permits the necessary relative movement between the chaser arm $h$ and the follower arm $e$ both mounted on the rockshaft, so that the chaser arm may be pressed toward the work to give the necessary depth of cut.

As one means of actuating the cam $p$ the end of the cam shaft $o$ may be carried through a fixed collar $x$ (Figs. 1, 5 and 6) say secured to one of the bearings $n$ which collar $x$ carries a toothed face $y$ (Fig. 6) or a series of registering devices of any kind. Feather keyed on the shaft outside this collar is a sliding plunger member $z$ backed by a spring 1 and permitted axial movement on the shaft, but rotating with it, and beyond that member is a hand wheel 2, or any suitable actuating means may be secured on the shaft.

Rotating with the hand wheel and shaft may be a sleeve or drum 3 bearing indication marks or figures, such for example as shown in Fig. 8 and around that may be a fixed barrel or casing 4 with an aperture or slot 5 therein (Fig. 5) through which the marks or figures on the sleeve or drum 3 can be read as they come around opposite same.

As the hand wheel 2 is rotated to adjust the angular position of the cam $p$ with respect to its axis, the sliding plunger $z$ rides over the teeth $y$ or registering means on the fixed collar $x$ and engages the next set of notches between teeth or the like so that a locking of the cam shaft is again effected until the next actuation of the hand wheel 2.

The indicator sleeve or drum 3 may bear figures showing the number of degrees of adjustment of the cam and may also have figures to indicate the position of the cam giving a depth of cut corresponding to any particular thread. Say 8, 10, 12, 14, for the depths corresponding to those numbers of threads to the inch. Thus the number of adjustments of position made is shown at a glance while the position when the required depth of cut that is the finishing position is also seen and the handling of the machine is rendered very simple. In the flat rendering of the marking on the drum 3 shown at Fig. 8, the "zero" position for the degrees of actuation of the cam shaft $o$ is shown as 50 so that the numbers will not be confused with the numbers indicating the threads to the inch.

It will be understood that this construction is given as an example only and the invention is not limited to the particular means set forth for enabling the adjustment of the control cam to be effected and its position indicated.

What I claim then is:—

1. In a chasing lathe, the combination with a chasing member movable relatively to the work and a cam controlling the working position thereof, a stop on the member engaging said cam, a manually operated device to regulate the angular position of the cam, and means to indicate the position of said cam for different depths of cut.

2. In a chasing lathe, the combination with a chasing member movable relatively to the work and a cam controlling the same in the working position, a stop on the member engaging said cam, a manually operated ratchet device whereby the cam may be moved to and held in defined angular positions, and an indicator operating in conjunction with said ratchet device to show the position to which the cam has been moved, for the purpose described.

3 In a chasing lathe, the combination with a chasing member movable relatively to the work and a cam controlling the working position of said chasing member, a stop on the member engaging said cam, a shaft upon which the cam is mounted, a device whereby said shaft may be manually rotated, a ratchet element on said shaft, a nonrotary ratchet element adapted to coöperate with the rotary element on the shaft, and a spring to effect engagement of the said ratchet elements, for the purpose described.

4. In a chasing lathe, the combination of a chasing member movable relative to the work, a shaft, a cam mounted upon said shaft, and being adapted to control the chasing member in its working position, a stop on the member which is adapted to be engaged by the cam, means whereby the shaft may be rotated manually, means to retain the said shaft in defined positions after rotation, an index sleeve fast with the shaft, and a fixed chasing within which said sleeve is rotatable, said casing having an aperture through which the indications on the sleeve may be read, for the purpose described.

5. In a chasing lathe, in combination, a chasing member movable relative to the work, a shaft, a cam slidably mounted upon said shaft, a stop formed in the member adapted to be engaged by said cam whereby to control the member in its working position, means whereby said shaft may be rotated to regulate the angular position of the cam, means to impart traverse to the chasing member while in the working position, and means to cause the cam to travel along its shaft in company with the chasing member.

6. In a chasing lathe, in combination, a chasing member movable relative to the work, a stop upon such member, a cam adapted to engage said stop to control the member in its working position, means to regulate the angular position of the cam, a follower adapted when the chasing member is moved to the working position to coöperate with a hob to impart traverse movement to the chasing member, and a yielding device interposed between said follower and the chasing member.

7. In a chasing lathe, in combination, a chasing member movable relatively to the work, a cam to determine the working position of said chasing member, means to regulate the angular position of the cam, and a stop on the chasing member to make contact with the cam, said stop being mounted in an adjustable sleeve carried on the chasing member, substantially as described.

In testimony whereof I have signed my name to this specification in the presence of two subscribing witnesses.

FREDERICK PRICE.

Witnesses:
AUGUSTUS E. INGRAM,
RD. B. NICHOLS.

Copies of this patent may be obtained for five cents each, by addressing the "Commissioner of Patents, Washington, D. C."